US012243052B2

(12) United States Patent
Iyer

(10) Patent No.: US 12,243,052 B2
(45) Date of Patent: *Mar. 4, 2025

(54) SYSTEMS AND METHODS FOR PROVIDING IMMUTABLE IDENTIFIERS FOR AGGREGATED DATA STRUCTURES

(71) Applicant: JPMORGAN CHASE BANK, N.A., New York, NY (US)

(72) Inventor: Ramaswamy Iyer, Westfield, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 3 days.

This patent is subject to a terminal disclaimer.

(21) Appl. No.: 18/049,545

(22) Filed: Oct. 25, 2022

(65) Prior Publication Data

US 2023/0083566 A1    Mar. 16, 2023

Related U.S. Application Data

(63) Continuation of application No. 17/113,750, filed on Dec. 7, 2020, now Pat. No. 11,521,206.

(51) Int. Cl.
*G06Q 20/38* (2012.01)
*G06Q 20/10* (2012.01)
*G06Q 40/06* (2012.01)

(52) U.S. Cl.
CPC ....... *G06Q 20/3829* (2013.01); *G06Q 20/108* (2013.01); *G06Q 40/06* (2013.01)

(58) Field of Classification Search
CPC ... G06Q 20/3829; G06Q 20/108; G06Q 40/06
See application file for complete search history.

(56) References Cited

U.S. PATENT DOCUMENTS 9,614,669 B1 * 4/2017 Cox, Jr. .............. H04L 63/0435
11,308,113 B1 * 4/2022 Boggs .................... G06Q 50/04
(Continued)

FOREIGN PATENT DOCUMENTS

WO    WO-2007121796 A1 * 11/2007 ............. G06Q 10/10
WO    WO-2016025291 A1 *  2/2016 ............. G06Q 30/02
(Continued)

OTHER PUBLICATIONS

Bank for International Settlements: Distributed Ledger technology in payment, clearing and settlement, Feb. 2017, pp. 1-29 (Year: 2017).*

(Continued)

*Primary Examiner* — Bijendra K Shrestha
(74) *Attorney, Agent, or Firm* — GREENBERG TRAURIG LLP

(57) ABSTRACT

Systems and methods for generating immutable keys for client relationships are disclosed. In one embodiment, a method may include: (1) generating a profile_ID unique immutable key for a client, wherein the profile_ID unique immutable key represents a relationship between the financial institution and the client; (2) receiving an identification of a third-party aggregator that aggregates information for at least one client account that the client has with a third-party financial institution; (3) assigning a FI_ID unique immutable key to the third-party financial institution that uniquely identifies the third-party financial institution; (4) generating and assigning a connection_ID unique immutable key that uniquely identifies a relationship between the client and the third-party financial institution; and (4) for each client account with the third-party financial institution, assigning the client account with the third-party financial institution an account_ID unique immutable key that uniquely identifies the account.

12 Claims, 4 Drawing Sheets

(56) References Cited

U.S. PATENT DOCUMENTS

| | | | | |
|---|---|---|---|---|
| 2004/0117625 A1* | 6/2004 | Grawrock | ............. | H04L 9/0877 |
| | | | | 713/168 |
| 2019/0325408 A1* | 10/2019 | Goroff | ............... | G06Q 20/3825 |
| 2020/0028929 A1* | 1/2020 | Xavier | ................... | H04L 63/08 |

FOREIGN PATENT DOCUMENTS

| | | | | |
|---|---|---|---|---|
| WO | 2019021028 | | 1/2019 | |
| WO | WO-2019021028 A1 * | 1/2019 | ............. | G06Q 20/02 |
| WO | 2020018389 | | 1/2020 | |
| WO | WO-2020055384 A1 * | 3/2020 | ............. | G06Q 20/32 |

OTHER PUBLICATIONS

Deloitte: Managing third-party risk of data aggregators—Navigating OCC Bulletin 2020-10, Apr. 14, 2020, pp. 1-8 (Year: 2020).*

Helland, Pat: Immutability Changes Everything, Sep.-Oct. 2015, ACMQueue, pp. 1-25 (Year: 2015).*

Wall, Jay: Utilizing Mutable and Immutable Data Stores with Compliance, May 13, 2019, Fluree PBC, pp. 1-22 (Year: 2019).*

Finra: Types of Investments: Know Before You Share: Be Mindful of Data Aggregation Risks, Match 29, 2018, pp. 1-3 (Year. 2018).

* cited by examiner

SYSTEMS AND METHODS FOR PROVIDING IMMUTABLE IDENTIFIERS FOR AGGREGATED DATA STRUCTURES

RELATED APPLICATIONS

The present application is a Continuation of U.S. patent application Ser. No. 17/113,750, filed Dec. 7, 2020, now U.S. Pat. No. 11,521,206, the disclosure of which is hereby incorporated, by reference, in its entirety.

BACKGROUND OF THE INVENTION

1. Field of the Invention

Embodiments generally relate to systems and methods for providing immutable identifiers for aggregated data structures.

2. Description of the Related Art

Business and customer driven requirements necessitate the continuity of information and adequate referential integrity of customer data. This is typically not an issue within an organization for custodied (e.g., accounts within the organization, such as a financial institution) accounts/assets. The landscape changes, however, for non-custodied (e.g., accounts outside of the organization) accounts and assets.

"Business justified" multi-aggregator strategy and integration solutions with Financial Technology (FinTech) providers is a challenge for financial institutions. For example, a customer may aggregate a multi-account relationship with a first bank using a first aggregator for the purposes of goal planning, asset allocation views, spend analytics, and spend summary. Given that the aggregator is not credit rating agency ("CRA") approved, the same data set cannot be leveraged for credit decisioning purposes should the customer apply for a credit card or home mortgage with a second bank; thus, integration with a second aggregator is required. The same accounts with the first bank are aggregated again, which causes duplication and a potentially incorrect spend analysis, historical net worth, asset allocation, and goal planning.

SUMMARY OF THE INVENTION

Systems and methods for providing immutable identifiers for aggregated data structures are disclosed. In one embodiment, in an information processing apparatus for a financial institution comprising at least one computer processor a method for generating immutable keys for client relationships may include: (1) generating a profile_ID unique immutable key for a client, wherein the profile_ID unique immutable key represents a relationship between the financial institution and the client; (2) receiving an identification of a third-party aggregator that aggregates information for at least one client account that the client has with a third-party financial institution; (3) assigning a FI_ID unique immutable key to the third-party financial institution that uniquely identifies the third-party financial institution; (4) generating and assigning a connection_ID unique immutable key that uniquely identifies a relationship between the client and the third-party financial institution; and (4) for each client account with the third-party financial institution, assigning the client account with the third-party financial institution an account_ID unique immutable key that uniquely identifies the account.

In one embodiment, the method may further include identifying an asset or a liability of the client held within the client account with the third-party financial institution, and assigning a Position_ID unique immutable key to the asset that uniquely identifies the asset of the liability.

In one embodiment, the asset may include an investment instrument.

In one embodiment, the investment instrument includes at least one of a stock, a bond, and cash.

In one embodiment, the liability may include a loan.

In one embodiment, the method may further include identifying an activity for the client account with the third-party financial institution, and assigning an Activity_ID unique immutable key to the activity that uniquely identifies the activity.

In one embodiment, the activity may include a transaction including at least one of a buy, a sell, a deposit, a withdrawal, a debit, a credit, a billpay, and a transfer.

In one embodiment, the method may further include receiving an identification of a second third-party aggregator that aggregates information for the at least one client account that the client has with the third-party financial institution. The same FI_ID unique immutable key uniquely identifies the third-party financial institution via the second third-party aggregator, the same connection_ID unique immutable key uniquely identifies the relationship between the client and the third-party financial institution via the second third-party aggregator, and the same account_ID unique immutable key uniquely identifies the at least one client account with the third-party financial institution via the second third-party aggregator.

In one embodiment, the method may further include retrieving client account information using the account_ID immutable keys.

In one embodiment, the client account information may be collected only once using the account_ID immutable keys.

According to another embodiment, a system for generating immutable keys for client relationships may include a data ingestion engine comprising at least one computer processor that may be configured to receive a profile_ID unique immutable key for a client, wherein the profile_ID unique immutable key represents a relationship between a financial institution and the client, receive an identification of a third-party aggregator that aggregates information for at least one client account that the client has with a third-party financial institution, assign a FI_ID unique immutable key to the third-party financial institution that uniquely identifies the third-party financial institution, generate and assign a connection_ID unique immutable key that uniquely identifies a relationship between the client and the third-party financial institution, and, for each client account with the third-party financial institution, the data ingestion engine assign the client account with the third-party financial institution an account_ID unique immutable key that uniquely identifies the account and receive data for each client account with the third-party financial institution. The system may also include a data processing engine comprising at least one computer processor that may be configured to receive the data for each client account with the third-party financial institution and processes the data using the account_ID unique immutable key for the client account. The system may also include a data access portal, wherein an internal or an external system accesses the processed data for at least one of the client accounts with the third-party financial institution.

In one embodiment, the data ingestion engine may be further configured to identify an asset or a liability of the client held within the client account with the third-party financial institution, and assign a Position_ID unique immutable key to the asset that uniquely identifies the asset of the liability.

In one embodiment, the asset may include an investment instrument.

In one embodiment, the investment instrument includes at least one of a stock, a bond, and cash.

In one embodiment, the liability may include a loan.

In one embodiment, the data ingestion engine may be further configured to identify an activity for the client account with the third-party financial institution, and assign an Activity_ID unique immutable key to the activity that uniquely identifies the activity.

In one embodiment, the activity may include a transaction including at least one of a buy, a sell, a deposit, a withdrawal, a debit, a credit, a billpay, and a transfer.

In one embodiment, the data ingestion engine may be further configured to receive an identification of a second third-party aggregator that aggregates information for the at least one client account that the client has with the third-party financial institution. The same FI_ID unique immutable key uniquely identifies the third-party financial institution via the second third-party aggregator, the same connection_ID unique immutable key uniquely identifies the relationship between the client and the third-party financial institution via the second third-party aggregator, and the same account_ID unique immutable key uniquely identifies the at least one client account with the third-party financial institution via the second third-party aggregator.

In one embodiment, the data ingestion engine may be further configured to retrieve client account information using the account_ID immutable keys.

In one embodiment, the client account information may be collected only once using the account_ID immutable keys.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments generally relate to systems and methods for providing immutable identifiers for aggregated data structures.

Figure 1:
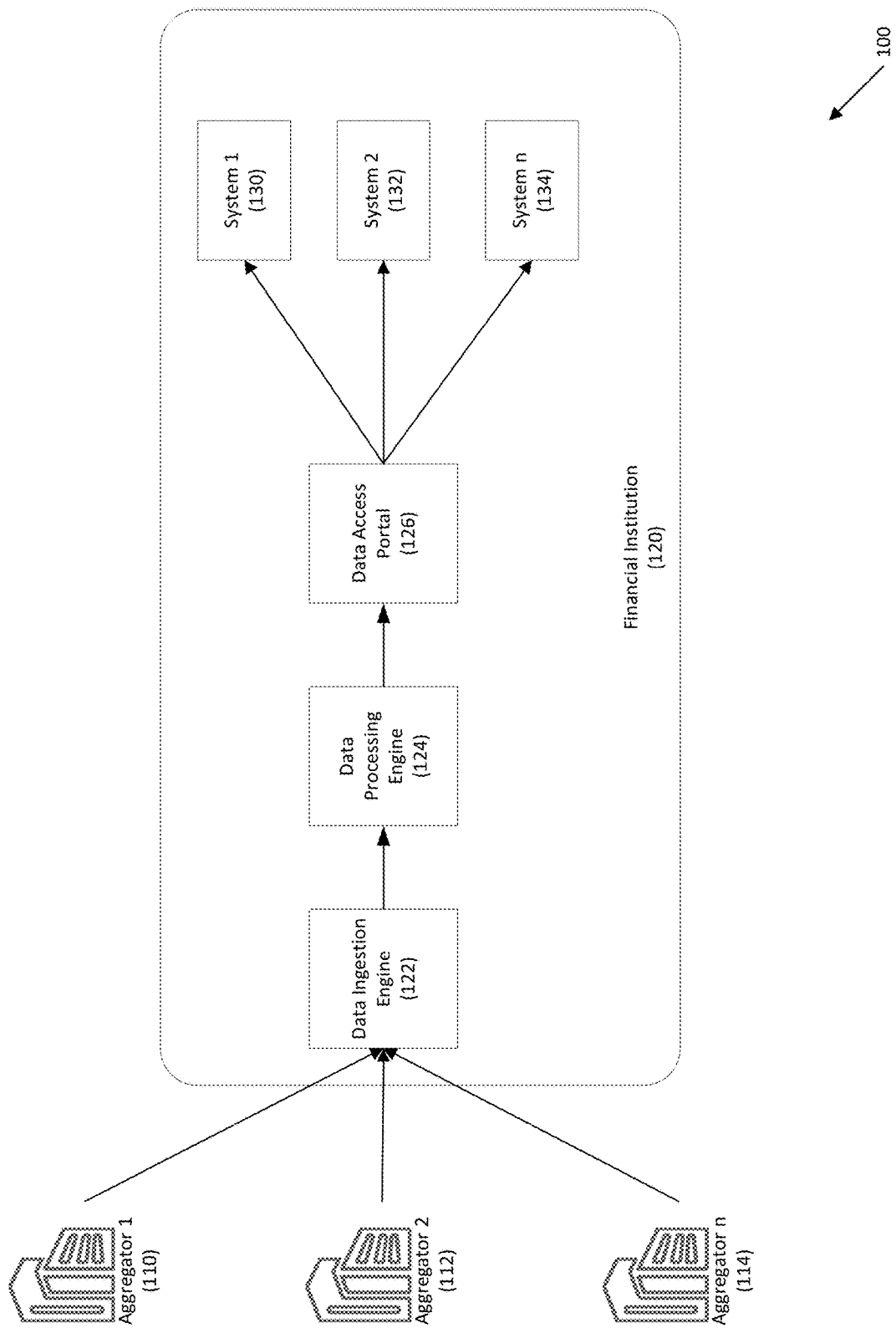
FIG. 1 depicts a system for providing immutable identifiers for aggregated data structures according to one embodiment.

Referring to FIG. 1, a system for providing immutable identifiers for aggregated data structures is disclosed according to one embodiment. System 100 may include one or more aggregators (e.g., aggregator 110, 112, 114) and financial institution 120. Aggregators 110, 112, 114 may include financial advisors, investment managers, financial technology (FinTech) providers, service providers, other financial institutions, etc. with which a customer may register and authorize to release financial information.

Financial institution 120 may be a bank, a FinTech, etc. Financial institution 120 may receive aggregated, non-custodial financial data from one or more aggregators 110, 112, 114. For example, financial institution 120 may receive aggregated, non-custodial financial data and ingest it using data ingestion engine 122, may process the ingested data using data processing engine 124, and may provide access to the processed data using data access portal 126. One or more system 130, 132, 134, which may be systems that are internal or external to financial institution 120, may access the processed data.

In embodiments, data ingestion engine 122 may assign one or more immutable (identity) keys to the incoming data from aggregators 110, 112, 114. For example, immutable keys may be created across various data classes compliant with financial institution 120's standards and data dictionaries. Examples of immutable keys include keys that identify the connection with the aggregator (e.g., Connection-ID), a key that identifies another financial institution that may hold financial data for the customer and may provide that financial data directly or indirectly (e.g., FI-ID), an account identifier (e.g., Account-ID), a position identifier (e.g., Position-ID), a security identifier (e.g., Security-ID), and a transaction identifier (e.g., Transaction-ID). Additional keys, such as an Enterprise-Party Identifier (e.g., EPI-ID which may be assigned to the party by the organization), a key that identifies a prospect (e.g., Prospect-ID), etc. may be used as is necessary and/or desired.

The naming of each immutable key is exemplary only, and different naming conventions may be used as is necessary and/or desired. Additional, fewer, and/or different immutable keys may be used as is necessary and/or desired.

In embodiment, the immutable keys, other than customerID, may be nuanced to a specific data-class. For example, based on the specific domain, immutable keys are generated for multiple data classes. The business data entities may be identified as follows: Client, Account, Positions, Activity, and Connection External Financial Institution FI. Client or customer may already be uniquely identified within the forms systems with a ECI or Digital ProfileID. Immutable keys may be generated for all high-level data classes, and the rules for generating the immutable keys are nuanced because the algorithm for each entity may be different.

In one embodiment, data processing engine 124 may process the data using the immutable keys assigned to the Client, Account, Positions, Activity, and Connection External Financial Institution FI.

Figure 2:
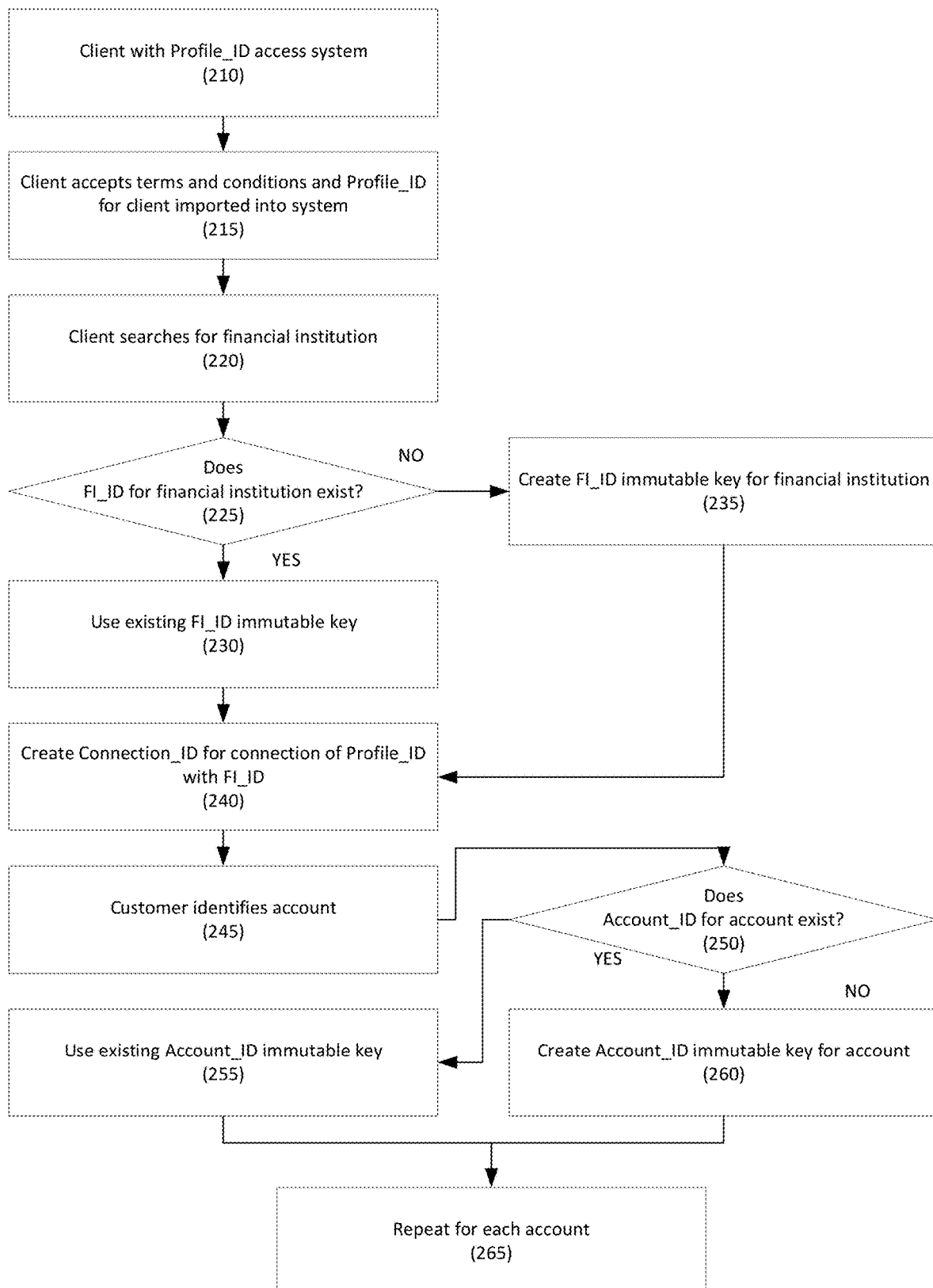
FIG. 2 depicts a method for generating immutable keys for client relationships according to one embodiment.

Referring to FIG. 2, a method for generating immutable keys for client relationships is provided according to an embodiment.

In step 210, a client, or customer, of a bank may access an account management system. In one embodiment, the client may have a unique identifier for the client's profile, such as a Profile_ID. In one embodiment, if the client does not have a unique identifier, it may be created.

In step 215, the client may be presented with terms and conditions for using the system. If the client accepts, the client's Profile_ID may be imported into the system.

In step 220, the client may wish to add the client's accounts with third party financial institutions. In one embodiment, the client may use a third-party aggregator, such as YODLEE, PCR, FINICITY, QUICKBOOKS, etc. as a third-party aggregator of third party financial institution and other accounts (e.g., investment accounts). In one embodiment, the user may its provide login information for the third party aggregator.

To add the third party financial institution, the client may search for the third party financial institution by entering the third party financial institution's name, symbol, a URL, logo, address, icon, routing number, stock ticker number, etc.

If, in step 225, a check may be made to see if the e third party financial institution's name or uniform resource locator (URL) matches an existing external financial institution's URL. If the third party financial institution exists in the system, in step 230, an existing third party financial institution immutable key, such as FI_ID may be used to identify the third party financial institution.

If the third party financial institution does not exist in the system, in step 235, a third party financial institution immutable key (FI_ID) may be created.

Once the FI_ID is identified, in step 240, an immutable key for the relationship, such as Connection_ID, may be created. For example, embodiment, the client may be provided with a login workflow for the third party financial institution. After a successful login workflow (which may include multifactor authentication), the Connection_ID immutable key may be created.

For example, Client 1 (ECI 1) and Client 2 (ECI 2) may each have an account with the external financial institution, and each client may wish to aggregate their accounts. The external financial institution may be identified with external financial institution ID (FI_ID 1). The ECI 1 to FI_ID 1 relationship may be uniquely identified with the "Connection_ID 1" immutable key, and the ECI 2 to FI_ID 1 relationship may be uniquely identified with the "Connection_ID 2" immutable key.

In one embodiment, a relationship between the aggregator providing the third party financial institution information and the third party financial institution may be maintained, but any aggregator immutable key may not be proliferated downstream.

In one embodiment, multiple third party financial institution immutable keys may be collapsed into a single third party financial institution immutable key. For example, when one third party financial institution acquires another third party financial institution, the third party financial institution immutable keys for the acquired third party financial institution may be merged into the third party financial institution immutable key for the acquiring third party financial institution if desired.

In embodiments, separate third party financial institution immutable keys may be maintained. This may be based on customer preferences, machine learning, etc.

After the immutable key for the relationship is created, the customer may wish to add the accounts that the customer has with the financial institution. An account immutable key may include characteristics that are relatable to the client and the product as well as a level of service. For example, the account immutable key may be a construct that is unique to a client and within the context of the third part financial institution, such as an account number, a credit card number, etc.

Thus, in step 245, the client may identify an account that the customer has with the financial institution. The client may provide an account number, account name, balance, etc. as is necessary and/or desired.

In step 250, the system may determine if there is an immutable key, such as an Account_ID, for the account. For example, the client may have already added the same account with a different third-party aggregator. Thus, embodiments may check existing account numbers to see if the account number provided by the client has already been assigned an Account_ID.

In embodiments, in addition to checking account numbers, the account type, balance, recent transactions, etc. may be checked to see if the account has already been assigned an Account_ID.

If the account exists, in step 255, the existing Account_ID immutable key may be used to identify the account.

If the account has not been added, in step 260, an immutable key, such as Account_ID, may be created for the account.

In step 265, the steps of identifying an account (245) and using an existing Account_ID immutable key (255) or creating an Account_ID immutable key (260) may be repeated for each account.

Depending on the type of account, similar processes may be followed to assign immutable keys for aspects of the account(s). For example, an immutable key may be generated for each investment instrument in the portfolio (e.g., Security_ID), an immutable key may be generated for assets or liability associated to an account (e.g., Position_ID), and an immutable key may be generated for each activity (e.g., Activity_ID) involving the client account.

Examples of assets may include stocks, bonds, and cash. An example of a liability is a loan.

In one embodiment, account data, such as the account balance, transactions, etc., may be retrieved from the host third party financial institution. In one embodiment, the data may be retrieved after each account is assigned its Account_ID immutable key, after all accounts have been assigned their Account_ID immutable keys, or at any other suitable time.

In one embodiment, the information may be retrieved from the aggregator, or it may be retrieved directly from the third party financial institution, or from a combination of both.

In one embodiment, the account data may be pulled from the third-party bank or the third-party aggregator. In another embodiment, the account data may be pushed to the system by the third-party bank or the third-party aggregator. The account data may be pushed or pulled on demand, periodically (e.g., nightly), or in any other suitable manner (e.g., batches).

Table I, below, illustrates the usage of new (N) or existing (E) immutable keys in different scenarios involving a single third-party aggregator:

TABLE I

| Scenario | User | Connect | F.I. | Account | Activity | Position | Security |
|---|---|---|---|---|---|---|---|
| New User-first time | N | N | N | N | N | N | N |
| Existing User New connection | E | N | N | N | N | N | N |

TABLE I-continued

| Scenario | User | Connect | F.I. | Account | Activity | Position | Security |
|---|---|---|---|---|---|---|---|
| Existing Connection New account | E | E | E | N | N | N | N |
| Existing Connection Same account, new position, activity | E | E | E | E | N | N | N |
| New User First time, new connection, existing FI | N | N | R | N | N | N | N |
| New User, Connection, Account, Position, Activity, Existing Security | N | N | N | N | N | N | E |

Table II, below, illustrates the usage of new (N) or existing (E) immutable keys in different scenarios involving multiple third-party aggregators (a new third-party aggregator is identified with a *):

TABLE II

| Scenario | User | Connect | F.I. | Account | Activity | Position | Security |
|---|---|---|---|---|---|---|---|
| New User First time ever | N | N | N | N | N | N | N |
| New User * (Exists with system) New Connection | E | N | N | N | N | N | N |
| Existing User New Connection | E | N | N | N | N | N | N |
| Existing Connection New Account | E | E | E | N | N | N | N |
| Existing Connection Same Account, New Position, New Activity | E | E | E | E | N | N | N |
| New User * First Time, New Connection, Existing F.I. | N | N | E | N | N | N | N |
| New User * New Connection, Account, Position, Activity, Existing Security | N | N | N | N | N | N | E |

Figure 3:
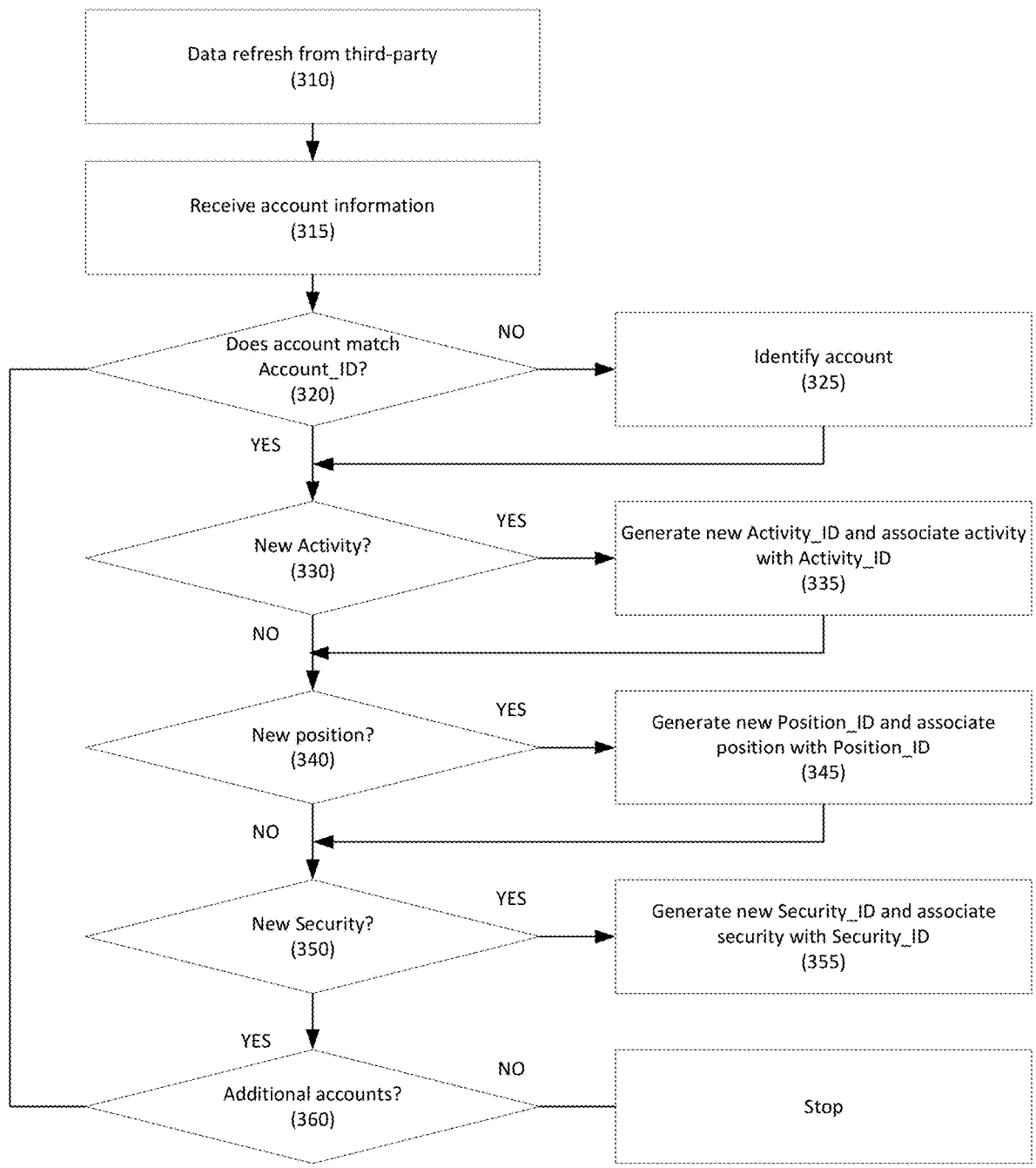
FIG. 3 depicts a method for updating client information according to one embodiment.

Referring to FIG. 3, a method for updating client information is illustrated according to an embodiment.

In step 310, the system may receive a data refresh from the third party financial institution and/or third-party aggregator. In step 315, account information may be received.

In step 320, the account information may be used to identify an account immutable key (e.g., Account_ID). For example, if the account information includes an account number, this may be used to identify the account immutable key.

If the account does not match the account_ID immutable key, in step 325, the account may be matched using account balances, transactions, etc.

Next, in step 330, the account information may be checked for new activity, such as transactions, since the last refresh. If there is new activity, in step 335, a new immutable key for the activity (e.g., activity_ID) may be created.

Examples of activities include a buy, a sell, a deposit, a withdrawal, a debit, a credit, a billpay, a transfer, etc.

In step 340, the account information may be checked for new positions since the last refresh. If there are new positions, in step 345, a new immutable key for the position (e.g., position_ID) may be created.

In step 350, the account information may be checked for new securities added since the last refresh. If there are new securities, in step 355, a new immutable key for each new security (e.g., security_ID) may be created.

In step 360, the process may be repeated for each account received in the account information.

Table III, below, illustrates the usage of new (N) or existing (E) immutable keys in second day scenarios involving a single third-party aggregator:

TABLE III

| Scenario | User | Connect | F.I. | Account | Activity | Position | Security |
|---|---|---|---|---|---|---|---|
| Day 2 refresh Incremental activity | E | E | E | E | N | E | E |
| Day 2 refresh New Position, New Security | E | E | E | E | N | N | N |
| Day 2 refresh New position, Existing Security | E | E | E | E | N | N | E |

Table IV, below, illustrates the usage of new (N) or existing (E) immutable keys in second day scenarios involving multiple third-party aggregators (a new third-party aggregator is identified with a *):

TABLE IV

| Scenario | User | Connect | F.I. | Account | Activity | Position | Security |
|---|---|---|---|---|---|---|---|
| Day 2 refresh Incremental activity | E | E | E | E | N | E | E |
| Day 2 refresh New Position, New Security | E | E | E | E | N | N | N |
| Day 2 refresh New position, Existing Security | E | E | E | E | N | N | E |

Figure 4:
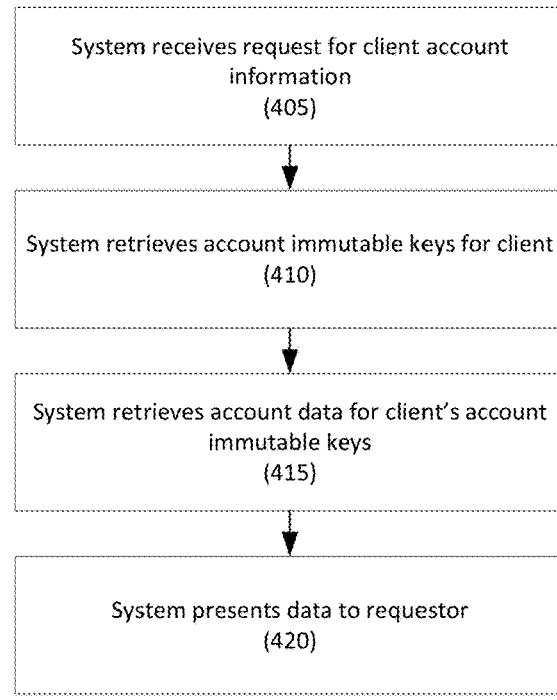
FIG. 4 depicts a method for collecting customer account data according to one embodiment.

Referring to FIG. 4, a method for collecting customer account data is provided according to an embodiment.

In step 405, the system may receive a request for all of client's account information.

In step 410, the system may retrieve the client's account immutable keys (e.g., account_IDs).

In step 415, the system may retrieve current stored data for each account immutable key. In embodiments, because each account has a single immutable key, the information for the same account will not be retrieved twice. For example, the same FI_ID unique immutable key uniquely identifies the third-party financial institution via the second third-party aggregator, the same connection_ID unique immutable key uniquely identifies the relationship between the client and the third-party financial institution via the second third-party aggregator, and the same account_ID unique immutable key uniquely identifies the at least one client account with the third-party financial institution via the second third-party aggregator. Thus, the account data for each client account with the third-party financial institution will only be presented once, regardless of how many third-party aggregators may collect the data for the client account with the third-party financial institution.

In step 420, the system may present the data to the requestor.

Although several embodiments have been disclosed, these embodiments are not exclusive to each other and features and elements in one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for updating client information, comprising:
receiving, by a computer processor in an information processing apparatus for a financial institution, client account information for a client account from a third-party financial institution;
identifying, by the computer processor, an activity of the client account with the third-party financial institution;
receiving, by the computer processor, an identification of a first third-party aggregator and second third-party aggregator, each of which that aggregates the client account information;
identifying, by the computer processor, an account_ID unique immutable key for the client account information, wherein the account_ID unique immutable key uniquely identifies an account for the client account information by the first third-party aggregator;
identifying, by the computer processor, new activity and existing activities in the client account information, wherein the new activity and the existing activities comprises a transaction including a buy, a sell, a deposit, a withdrawal, a debit, a credit, a billpay, and/or a transfer;
generating, by the computer processor, an activity_ID immutable key for the new activity, wherein the activity_ID immutable key uniquely identifies the new activity;
storing, by the computer processor, the new activity with the activity_ID immutable key and the account_ID unique immutable key;
identifying, by the computer processor, a new position in the client account information;
generating, by the computer processor, a position_ID immutable key for the new position, wherein the position_ID immutable key uniquely identifies the new position;
storing, by the computer processor, the new position with the position_ID immutable key and the account_ID unique immutable key; and
retrieving, by the computer processor and from a plurality of sources, stored activities and stored positions for the account using the account_ID unique immutable key, wherein the account_ID unique immutable key prevents stored activities and stored positions for the client account from being retrieved twice regardless of how many third-party aggregators collect data for the client account with the third-party financial institution.

2. The method of claim 1, further comprising:
identifying, by the computer processor, a new security in the client account information; and
generating, by the computer processor, a security_ID immutable key for the new security, wherein the security_ID immutable key uniquely identifies the new security.

3. The method of claim 1, wherein the position_ID immutable key is associated with an asset or a liability.

4. The method of claim 3, wherein the asset comprises an investment instrument.

5. The method of claim 4, wherein the investment instrument includes a stock, a bond, and/or cash.

6. The method of claim 3, wherein the liability comprises a loan.

7. A non-transitory computer readable storage medium, including instructions stored thereon, which when read and executed by one or more computer processors, cause the one or more computer processors to perform steps comprising:
receiving client account information for a client account from a third-party financial institution;
identifying an activity of the client account with the third-party financial institution;
receiving an identification of a first third-party aggregator and second third-party aggregator, each of which that aggregates the client account information;
identifying an account_ID unique immutable key for the client account information, wherein the account_ID unique immutable key uniquely identifies an account for the client account information by the first third-party aggregator;
identifying new activity and existing activities in the client account information, wherein the new activity and the existing activities comprises a transaction including a buy, a sell, a deposit, a withdrawal, a debit, a credit, a billpay, and/or a transfer;
generating an activity_ID immutable key for the new activity, wherein the activity_ID immutable key uniquely identifies the new activity;
storing the new activity with the activity_ID immutable key and the account_ID unique immutable key;
identifying a new position in the client account information;
generating a position_ID immutable key for the new position, wherein the position_ID immutable key uniquely identifies the new position;
storing the new position with the position_ID immutable key and the account_ID unique immutable key; and
retrieving, from a plurality of sources, stored activities and stored positions for the account using the account_ID unique immutable key, wherein the account_ID unique immutable key prevents stored activities and stored positions for the client account from being retrieved twice regardless of how many third-party aggregators collect data for the client account with the third-party financial institution.

8. The non-transitory computer readable storage medium of claim 7, further including instructions stored thereon, which when read and executed by one or more computer processors, cause the one or more computer processors to identify a new security in the client account information, and generate a security_ID immutable key for the new security, wherein the security_ID immutable key uniquely identifies the new security.

9. The non-transitory computer readable storage medium of claim 7, wherein the position_ID immutable key is associated with an asset or a liability.

10. The non-transitory computer readable storage medium of claim 9, wherein the asset comprises an investment instrument.

11. The non-transitory computer readable storage medium of claim 10, wherein the investment instrument includes a stock, a bond, and/or cash.

12. The non-transitory computer readable storage medium of claim 9, wherein the liability comprises a loan.

* * * * *